United States Patent

[11] 3,562,623

[72] Inventor Robert P. Farnsworth
  Los Angeles, Calif.
[21] Appl. No. 745,245
[22] Filed July 16, 1968
[45] Patented Feb. 9, 1971
[73] Assignee Hughes Aircraft Company
  Culver City, Calif.
  a corporation of Delaware

[54] CIRCUIT FOR REDUCING STRAY CAPACITY EFFECTS IN TRANSFORMER WINDINGS
  7 Claims, 7 Drawing Figs.
[52] U.S. Cl. ................................................. 321/2,
  320/1; 321/15; 323/58
[51] Int. Cl. ..................................................... H02m 3/32
[50] Field of Search......................................... 321/2, 8,
  27, 16, 15; 323/6, 44, 45, 48, 58, 87, 60, 61; 320/1;
  328/59

[56] References Cited
UNITED STATES PATENTS
2,881,382  4/1959  Amato ........................... 321/27
2,953,754  9/1960  Roesel, Jr. ..................... 321/27X
2,959,726  11/1960 Jensen ........................... 321/2X FOREIGN PATENTS
538,661   11/1931  Germany ....................... 321/15
607,081   12/1934  Germany ....................... 321/15
257,872   4/1949   Switzerland ................... 321/15
911,305   11/1962  Great Britain ................. 321/15
125,304   0/1960   U.S.S.R. ....................... 321/16
135,316   0/1961   U.S.S.R. ....................... 321/8

Primary Examiner—James D. Trammell
Assistant Examiner—G. Goldberg
Attorneys—James K. Haskell and Walter J. Adam ABSTRACT: A transformer charging system that provides a highly efficient operation and that substantially eliminates switching transients. The high voltage or secondary winding of the transformer as well as the primary winding in some arrangements, is divided into segments which are isolated from each other by unidirectional current conductive devices such as diodes. For charging a load coupled to the secondary winding, current pulses are repetitively applied to the primary winding from the power source with the flyback voltage resulting from the pulse terminations causing current to flow through the diodes. The diodes allow the stray capacitance associated with each segment to initially charge but prevent them from discharging between the repetitive operations, which would cause additional flow of primary current and dissipation losses.

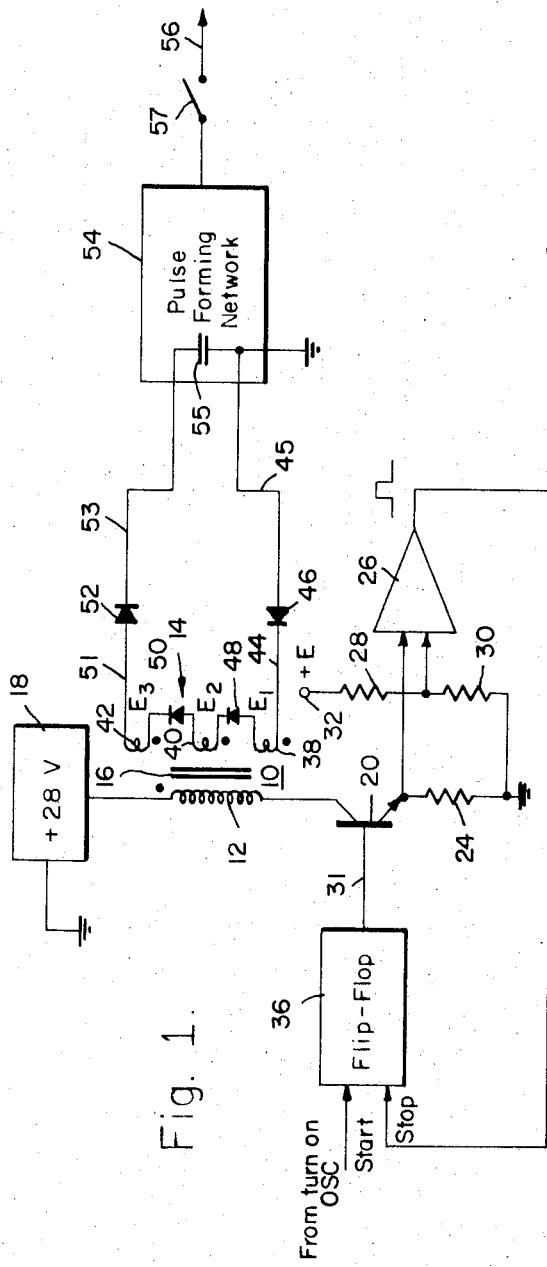
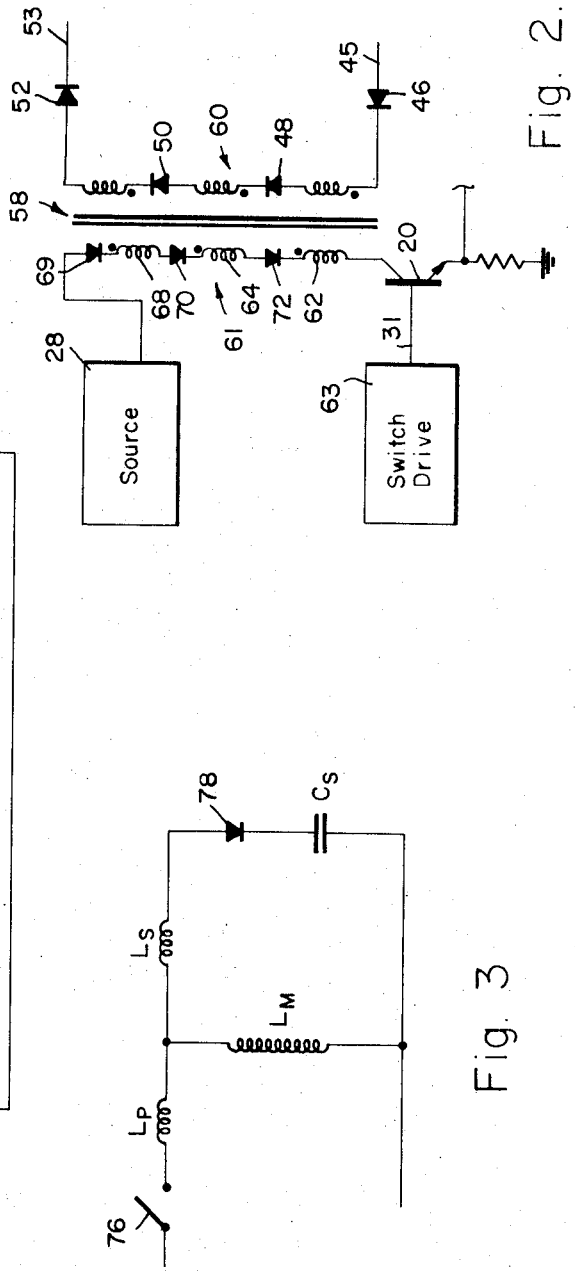
Fig. 1.
Fig. 2.
Fig. 3.
Robert P. Farnsworth,
INVENTOR.
BY.
Walter J. Adam
ATTORNEY.

PATENTED FEB 9 1971

CIRCUIT FOR REDUCING STRAY CAPACITY EFFECTS IN TRANSFORMER WINDINGS

BACKGROUND OF THE INVENTION

This invention relates to pulse charging circuits and particularly to an improved and efficient transformer charging system.

In high voltage power supply systems such as the type utilized to charge pulse forming networks in laser range finders or utilized to charge any energy storage system, inefficiency and the presence of switching transients has been found to cause severe problems. Conventionally a transformer is utilized with the primary winding coupled across a relatively low voltage power source through a switch and with the secondary winding coupled through a diode to a storage unit such as a pulse forming network. The switch is continuously pulsed until the pulse forming network is charged with a desired amount of charge at a selected high voltage. A typical network in this type of system may be charged to +2000 volts from a +28 volt power source, for example. The transformer and primary charging current required by the stray capacitance voltage changes has been found to result in an inefficient operation because of the current dissipation in the switch and in the windings. Also, this undesired current increases the switching transients so as to adversely affect the power source and the switch control circuits.

Briefly, one high voltage charging system in accordance with this invention includes a transformer structure with the primary winding coupled across a power source through a switch such as a transistor. The high voltage winding is segmented with each segment electrically isolated from the others and from the output leads by diodes or diode type devices arranged with a selected polarity. The voltage change across the stray capacitance is substantially reduced as a result of this segmentation so that dissipation of reflected current in the primary winding during the switching operations as well as interference with the switching is substantially reduced. Also, the amplitude of developed switching transient spikes is greatly reduced. In other arrangements in accordance with the invention, the primary winding may also be segmented and diode isolated. Further, the principles of the invention are applicable to systems utilizing half wave rectification or full wave rectification.

Therefore, it is an object of this invention to provide an improved charging system.

It is a further object of this invention to provide a voltage transformer charging system that is highly efficient.

It is another object of this invention to provide a high voltage charging system responsive to a relatively low voltage power source and operable with a minimum of current dissipation.

It is still another object of this invention to provide a transformer charging system in which the effect of stray capacitance is substantially reduced.

It is still another object of this invention to provide improved transformer structures.

DESCRIPTION OF THE DRAWINGS

The novel features of this invention, as well as the invention itself, both as to its organization and method of operation, will best be understood from the accompanying description, taken in connection with the accompanying drawings, in which like reference characters refer to like parts, and in which:

FIG. 1 is a schematic block and circuit diagram of a high voltage transformer charging system in accordance with the principles of the invention;

FIG. 2 is a schematic circuit diagram of an alternate transformer arrangement that may be utilized in the system of FIG. 1 within the principles of the invention;

FIG. 3 is an equivalent circuit diagram of the transformer of the system of FIG. 1 in accordance with the invention;

DESCRIPTION OF THE PREFERRED EMBODIMENT

Figure 4:
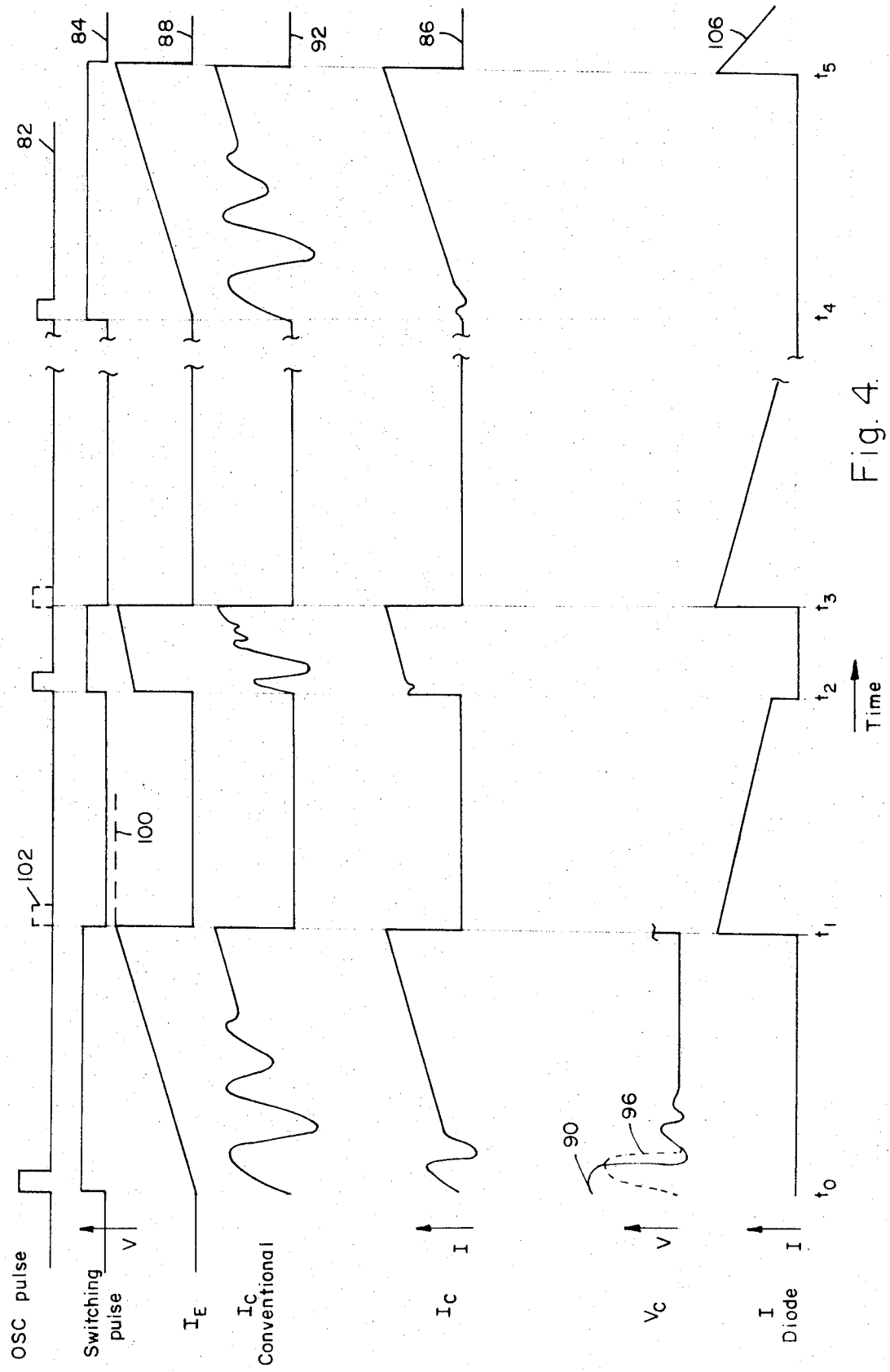
FIG. 4 is a schematic diagram of waveforms of voltage and current as a function of time for explaining the operation of the system of FIG. 1.

Referring first to FIG. 1, a high voltage charging system in accordance with the invention includes a transformer 10 having a primary winding 12, a secondary winding 14 and a suitable magnetic coupling material or medium 16. The winding 12 is coupled from a suitable power source such as a +28 volt power source 18 to one terminal of a switch such as to the collector of an NPN type transistor 20. The emitter of the transistor 20 is coupled through a resistor 24 to a suitable source of reference potential such as ground and is also coupled to a differential amplifier or current comparator circuit 26. The other input terminal of the differential amplifier 26 is coupled between resistors 28 and 30 which in turn are coupled between a +E reference f voltage source 32 and ground. A bistable multivibrator or flip flop 36 has one output terminal coupled through a lead 31 to the base of the transistor 20 and has first and second input terminals with the first input terminal coupled to the differential amplifier 26 for terminating the charging transformer pulses. The second input terminal is responsive to a signal from a turn on oscillator (not shown) for starting the charging operation. The high voltage or secondary winding 14 of the transformer 10 is divided into segments or portions 38, 40 and 42 which may be of substantially the same number of turns. The segment 38 has one end coupled to a lead 44 which in turn is coupled to the cathode of a diode 46 and has a second end coupled to the anode of a diode 48. The segment 40 has one end coupled to the cathode of the diode 48 and the other end coupled to the anode of a diode 50. The segment 42 has one end coupled to the cathode of the diode 50 and has the other end coupled through a lead 51 to the anode of a diode 52. The anode of the diode 46 and the cathode of the diode 52 are coupled through respective leads 45 and 53 to a pulse forming network 54 which may periodically pass charge energy through a switch 57 and a lead 56 to a utilization device such as a pump flash tube in a laser system. The network 54 may be capacitive as represented by a capacitor 55 coupled between the lead 53 and the lead 45 which in turn is coupled to a suitable source of reference potential such as ground. It is to be noted that the changing system of the invention is applicable to charging any of a plurality of energy utilization and storage devices and is not to be limited to any particular type.

Referring now to FIG. 2, which is another transformer arrangement in accordance with the invention, the primary winding may also be divided in segmented fashion corresponding to segments of the secondary winding. A transformer 58 includes a secondary winding 60 segmented similar to the winding 14 of FIG. 1 with the segments separated by diodes 46, 48, 50 and 52 and includes a primary winding 61 having segments 62, 64 and 68 separated by diodes 69, 70 and 72. The winding 61 may be coupled between the source 28 and the switch 20 responsive to a switch drive source 63 similar to the arrangement of FIG. 1. In the illustrated arrangement, the switch 20 operates as one of the isolating diodes for the winding segments.

Referring now back to FIG. 1 as well as to the equivalent circuit diagram of FIG. 3, the transistor 20 is represented by a switch 76 and the primary, secondary and mutual inductances are represented by respective inductors $L_p$, $L_s$ and $L_m$. A diode 78 represents a composite of the diodes in the secondary winding charging the stray capacitance $C_s$ which has a value proportional to the number of secondary turns over the number of primary turns. The system of the invention provides pulses of current to the inductive elements but after the initial charging of the stray capacitance $C_s$, very little current is required to be supplied to the capacitance $C_s$ because of relatively small voltage changes thereacross.

Referring now to FIG. 4 as well as to FIG. 1, the oscillator pulse of a waveform 82 triggers the flip flop 36 to a first state which applies a switching pulse of a waveform 84 to the base of the transistor 20 so that current is conducted through the primary winding 12. At a time $t_0$ which may represent the start of a charging operation, current of a waveform 86 flows through the collector of the transistor 20 while the voltage of a waveform 88 starts to rise on the emitter of the transistor 20. The voltage of a waveform 90 on the collector of the transistor 20 oscillates similar to the current of the waveform 86 caused by the change of voltage of the stray capacitance $C_s$. The resonant fluctuation of the waveform 86 is relatively small compared to that of a conventional transformer arrangement indicated by a waveform 92. Dissipation at the transistor 20 and in the transformer windings is indicated as a curve 96 for the system of the invention, which energy loss is substantially larger for a conventional system. During the first half cycle or the period between times $t_0$ and $t_1$, the diodes 46, 48, 50 and 52 are back biased so that current does not flow out of the winding 14 and the stray capacitance maintains its charge. When the emitter current of the waveform 88 increases to a threshold level 100, the differential amplifier 26 develops a pulse indicated as a dotted pulse 102 to trigger the flip-flop 36 to the opposite state. The switching pulse of the waveform 84 falls to the lower level at time $t_1$ to bias the transistor 20 to the nonconductive state. As a result, the current of the waveform 86 is terminated, the voltage is rapidly reversed across the secondary winding 14 and the diodes 46, 48, 50 and 52 are biased into conduction so that current of a waveform 106 flows to the pulse forming network 54. Thus, at time $t_1$, a positive flyback voltage is generated in the winding 14 and on the lead 53 and current flows into the capacitor 55 of the network 54. The energy in the transformer 10, which is retained as lines of flux between times $t_0$ and $t1$, is transferred out of the winding 14 between times $t1$ and $t_2$ when the flux lines collapse in the second half cycle of operation and the diodes 46, 48, 50 and 52 are all forward biased because of the reversal of voltage across the winding segments. During each second half cycle, the flyback voltage increases on the leads 51 and 53 from the previous half cycle as current flows to the network 54. At time $t_2$, the energy in the transformer 10 is not completely discharged as shown by the waveform 106.

At time $t_2$ in response to the oscillator pulse of the waveform 82, the transistor 20 is biased into conduction and current flows through the winding 12 as indicated by the waveform 86. The diodes 46, 48, 50 and 52 are all reverse biased and the stray capacitance of the segments is not discharged. The threshold voltage 100 at the emitter of the transistor 20 is reached at time $t_3$ in a relatively short period because energy remains in the transformer from the previous cycle. Also during the period between times $t_2$ and $t_3$, current is not required for charging the stray capacitance in the transformer. Because of the relatively small fluctuations of voltage on the stray capacitance between times $t_2$ and $t_3$, dissipation in the transistor 20 and in the transformer is relatively small to provide an efficient operation. Also, a minimum of voltage transients are applied to the power source 18.

After a few initial cycles have occurred, the charging operation continues in a similar manner with the energy all passing out of the winding 14 into the network 54 and as the energy discharge increases, the charge up time increases such as between times $t_4$ and $t_5$. The stray capacitance remains substantially charged and the charge in the storage network is gradually increased to a larger value during each second half cycle as the flyback voltage increases on the lead 51. When the network 54 is charged to a sufficient level, a sensing circuit (not shown) may close the switch 57 and transfer a high voltage pulse on the lead 56 to a utilization circuit (not shown). For example, a voltage of 2000 volts may be developed in the network 54 as a result of the continual transfer of energy from the +28 volt power source 18. The segmented primary winding of FIG. 2 operates in a similar manner with the diodes conducting such as between times $t_0$ and $t_1$ but back biased such as during times $t_1$ and $t_2$ to prevent the discharge of the stray capacitance in each segment. It is to be noted that the voltage swings in the primary and secondary windings may determine the desirability of segmenting the first or second windings or both windings in accordance with the principles of the invention.

Figure 5:
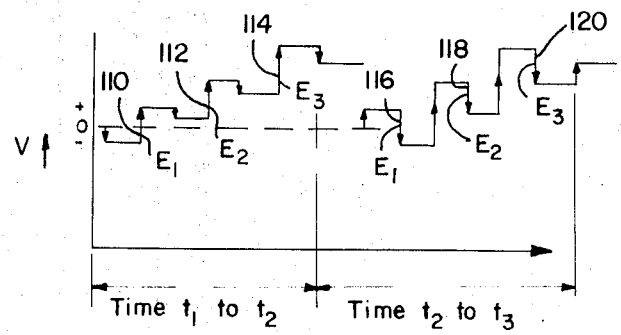
FIG. 5 is a schematic diagram of voltage versus two points of time for further explaining the relationships of the stray capacity voltages.

To further explain the segmented operation, the graph of FIG. 5 shows the change of the stray capacitance voltage $E_1$, $E_2$ and $E_3$ across each segment 38, 40 and 42 relative to 0 volts on the lead 45. After the first charging cycle or period, lines 110, 112 and 114 show the voltage across the stray capacitance of respective segments 38, 40 and 42 during a first half cycle ($t_1$ to $t_2$) when the diodes are all forward biased. During the following half cycle ($t_2$ to $t_3$), when the switch 20 is again conducting, the stray capacitance voltage of each segment reverses as shown by lines 116, 118 and 120. In the graph of FIG. 5 the voltage changes of lines 110, 112 and 114 occur simultaneously during the period between times $t_1$ and $t_2$ and the voltage changes of lines 116, 118 and 120 occur simultaneously between times $t_2$ and $t_3$. Thus in the system of the invention, the voltage reverses in each segment rather than around the reference or 0 voltage level. This small voltage change across the stray capacitance results in a relatively small reflected current flow in the primary winding 12 and a minimum of energy dissipation. If the voltage on the lead 53 is $E_0$ at any charge up time, the conventional change across the stray capacitance is $2E_0$ during each switching operation which would cause a current flow I in the primary of $I = \dfrac{C_s \times 2E_0}{\Delta T}$ where $\Delta T$ is the switching time of the switch 20. However in the illustrated system of the invention, the voltage change with three segments is $2 \times \dfrac{E_0}{6}$ since each winding reverses about the average "on" voltage or average voltage of that segment at any particular time of charge up of a load or network, instead of around ground potential. The stray capacitance current is thus reduced by a factor of 6 in the illustrated system of FIG. 1. The overall efficiency of the arrangement of FIG. 1, with the network 54 being charged to 2000 volts, has been estimated to be improved by 20 percent over the conventional arrangement.

Figure 6:
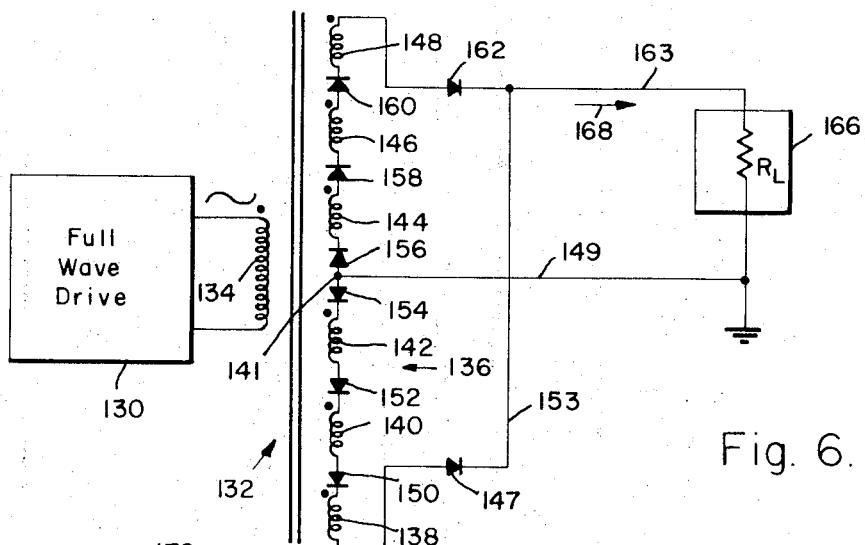
FIG. 6 is a schematic circuit and block diagram of a full wave charging system in accordance with the invention.

Referring now to FIG. 6, a full wave drive source 130 applies a signal such as a sine wave to a primary winding 134 of a transformer 132. A secondary winding 136 of the transformer 132 is divided into winding segments 138, 140, 142, 144, 146 and 148. The winding 136 has a center tap 141 coupled to a lead 149 with diodes 154 and 156 respectively coupled between the center tap and the windings 142 and 144. Diodes 152, 150 and 147 are respectively coupled between windings 142 and 140, windings 140 and 138 and winding 138 and a lead 153. Diodes 158, 160 and 162 are respectively coupled between windings 144 and 146, windings 146 and 148 and winding 148 and a lead 163. A load 166, which may include a resistance $R_L$, is coupled between the leads 163 and 149 and the lead 153 is coupled to the lead 163. During a first half cycle, the diodes 156, 158, 160 and 162 are biased into conduction and DC (direct current) current flows into the load $R_L$ in the direction of an arrow 168. During this first half cycle, the diodes 154, 152, 150 and 147 are back biased so that a relatively small change of voltage occurs across the stray capacitance of each segment resulting in a very small stray capacitance current flowing through the primary winding 134. During the second half cycle, the diodes 154, 152, 150 and 147 are biased into conduction and DC current flows into the load 166 along the path of the arrow 168. At the same time, the diodes 156, 158, 160 and 162 are back biased and a relatively small change occurs across the stray capacitance of each segment resulting in a very small stray capacitance current flowing through the primary winding 134. Thus current dissipation due to charging stray capacity in the windings and in the drive source 130 are substantially eliminated as well as undesirable switching transients by the segmenting arrangement in accordance with the invention.

Figure 7:
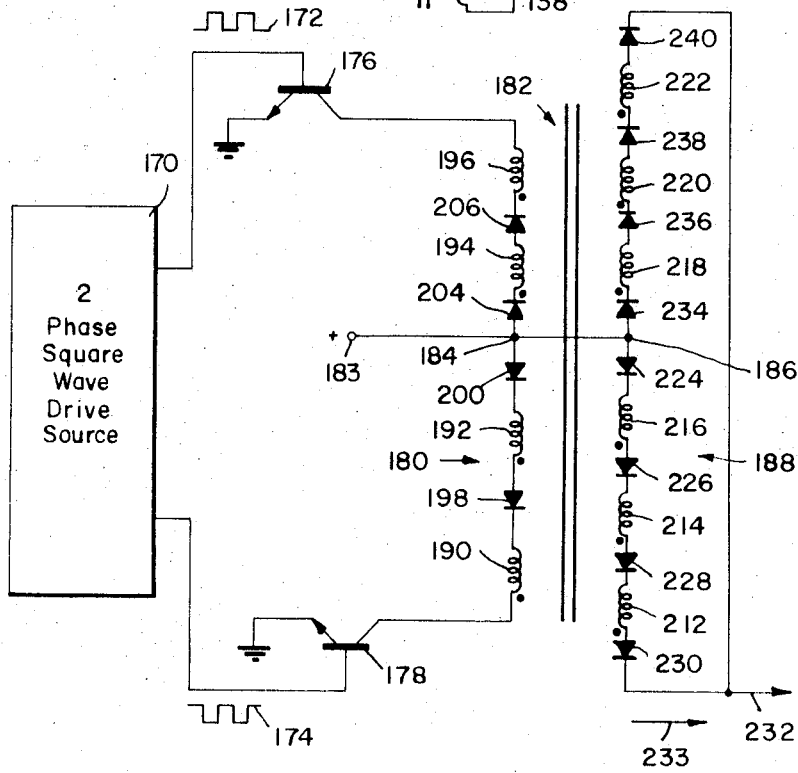
FIG. 7 is a schematic circuit and block diagram of a transformer charging system responsive to a two phase driving source in accordance with the invention.

Referring now the to the DC (direct current) to DC converter of FIG. 7, a two phase square wave drive source 170 applies pulses such as the square wave pulses of waveforms 172 and 174 which are 180° out of phase from each other, to the bases of respective switching transistors 176 and 178, which may be NPN type devices. The emitters of the transistors 176 and 178 are coupled to a suitable reference potential such as ground and the collectors are coupled to opposite ends of a primary winding 180 of a transformer 182. A source of reference potential 183 is coupled to a center point 184 of the winding 180 and may also be coupled to a center point 186 of a secondary winding 188. The winding 180 includes a suitable number of segments such as 190, 192, 194 and 196 with the cathode to anode paths of the diodes 198 and 200 respectively coupled between the point 184 and the winding 192 and between the windings 192 and 190. Also, in a second portion of the primary winding, diodes 204 and 206 have anode to cathode paths respectively coupled between the point 184 and the winding 194 and between the windings 194 and 196. It is to be noted that the transistors 176 and 178 perform the diode or unidirectional function for the respective segments 196 and 190. The secondary winding 188 includes a selected number of segments which may be 212, 214, 216, 218, 220 and 222. Diodes 224, 226, 228 and 230 have anode to cathode paths respectively coupled between the point 186 and the segment 216, between the segments 216 and 214, between the segments 214 and 212 and between the segment 212 and an output lead 232. Diodes 234, 236, 238 and 240 have anode to cathode paths respectively coupled between the point 186 and the winding 218, between the windings 218 and 220, between the windings 220 and 222 and between the winding 222 and the output lead 232.

In operation, during each half cycle of the waveforms 172 and 174, one transistor 176, 178 or the other conducts and current is passed through one portion or the other of the primary winding 180, that is, between the potential source 183 and the conducting transistor. When the lower portion of the primary winding 180 is conducting, for example, the diodes 224, 226, 228 and 230 are back biased as the energy is transferred to the upper portion of the winding 188. During the same half cycle, the transistor 176 is biased out of conduction and the upper portion of the secondary winding 188 is conducting current through the forward biased diodes 234, 236, 238 and 240 to the lead 232 as indicated by an arrow 233. The diodes 204 and 206 are reverse biased so that a stray capacitance current does not flow in section 194 and 196 of the primary winding. During the next half cycle of the waveforms 172 and 174, the transistor 176 is conducting, the transistor 178 is biased out of conduction, the diodes 234, 236, 238 and 240 are biased out of conduction and the diodes 224, 226, 228 and 230 are forward biased as current flows to the lead 232 as shown by the arrow 233. Also, the diodes 198 and 200 are reverse biased so that stray capacitance current does not flow between 192 and 190 in the primary winding. Because during the half cycle charging period of each half of the secondary winding 188 the diodes are back biased, a relatively small stray capacitance current flows in the primary winding 180 as discussed relative to FIGS. 1, 2 and 6. Thus a highly efficient DC generator is provided in response to waveforms 172 and 174 which may be generated by a bistable multivibrator responding to DC voltages, for example.

Thus there has been described an improved high voltage charging system operating with a high efficiency in which the transformer winding or windings are segmented and isolated with unidirectional elements so that when energy is transferred in the transformer through the primary winding, substantially no stray capacitive current flows in the secondary winding. Thus, substantial current is not induced in the primary winding from change of stray capacitance voltage and switching transients are minimized in the transformer. Upon removal of the source of energy, the flyback voltage in the secondary winding transfers current through all segments of the secondary winding to a load. The principles of the invention are applicable to either half wave or full wave operation.

I claim:

1. A system for charging a load comprising:
   a source of energy pulses having a predetermined polarity;
   transformer means having first and second winding structures, each with first and second ends and with said first and second ends of said first winding structure coupled to said source of energy pulses;
   a plurality of first unidirectional current conductive means with a different one coupled between each of a plurality of selected portions of said second winding structure and each with a first polarity along a current path through said second winding between said first and second ends; and
   and second and third unidirectional current conductive means respectively coupling said first and second ends of said second winding structure to said load, each with said first polarity relative to said current path through said second winding.

2. An energy transfer device comprising:
   first and second inductively coupled windings each having first and second ends, said second winding being divided into segments;
   a source of current pulses coupled to the first and second ends of said first winding; and
   a plurality of diode means each having an anode and a cathode and with a different one of said diode means coupled between each of the segments and to the first and second ends of said second winding, all of said diode means being coupled with a similar anode to cathode polarity along said second winding.

3. The combination of claim 2 in which said first winding is also divided into segments and a plurality of diode means, each having an anode and a cathode, are coupled between each of the segments and to said first and second ends of said first winding, all of said diode means being coupled with a similar anode to cathode polarity along said second winding.

4. A system for transferring energy to a load having first and second terminals comprising:
   a transformer having first and second windings each having first and second ends, said second winding being formed of segments;
   a power source coupled to the first end of said first winding;
   switching means coupled to the second end of said first winding; and
   a plurality of diodes each having an anode and a cathode and with a diode coupled between adjacent segments and a diode coupled between each of the first and second terminals of the load and the respective first and second ends of said second winding, said diodes having similar anode to cathode polarity through said second winding between said first and second terminals of said load.

5. A pulse forming system for providing high voltage pulses to an output terminal comprising:
   a transformer having first and second windings, each with first and second ends, said second winding being formed of a plurality of segments;
   a first voltage source coupled to the first end of said first winding;
   a second voltage source;
   switching means coupled between the second end of said first winding and said second voltage source;
   control means coupled to said switching means for periodically passing a pulse of current through said second winding during a first period and inhibiting said pulse of current during a second period;
   a pulse forming network having first, second and third terminals;
   a plurality of diodes, each having an anode and a cathode and with a diode coupled between each point of adjacent segments and a diode respectively coupled between each of the first and second ends of said second winding and said first and second terminals of said pulse forming network, said diodes having a similar anode to cathode polarity so that said diodes are reverse biased during said first period and current flows through said second winding and said pulse forming network during said second period; and a controllable switch coupled between the third terminal of said pulse forming network on said output terminal for controllably passing a high voltage pulse to said output terminal.

6. The combination of claim 5 in which said first winding is formed of a plurality of segments and including a plurality of diodes, each having an anode and cathode and with a diode coupled between adjacent segments and a diode coupled between said first voltage source and the first end of said first winding, said diodes in said first winding having a similar anode to cathode polarity so that said diodes in said first winding conduct during said first period and are reverse biased during said second period.

7. A DC to DC converter comprising:
an output terminal;
a source of two phase driving diving pulses;
a transformer having a first and second windings; each having first and second ends and a center point and each being divided into segments on both sides of said center point;
first switching means coupled between said source of driving pulses and the first end of said first winding, second switching means coupled between said source of driving pulses and the second end of said first winding;
a source of potential coupled to the center points of each of said first and second windings;
a plurality of first diodes, each having an anode and a cathode with a first diode coupled between the ends of adjacent segments of said first winding, between said first and second switching means and the respective first and second ends of said first winding and between the segments at the center point and said source of reference potential, said first diodes having opposite anode to cathode potentials on opposite sides of said center point; and
a plurality of second diodes each having an anode and a cathode with a second diode coupled between the ends of adjacent segments of said second winding, between the first and second ends of said second winding and the output terminal and between the segments at the center point and said source of reference potential, said second diodes having opposite anode to cathode potentials on opposite sides of said center point.